United States Patent Office 3,519,673
Patented July 7, 1970

---

3,519,673
PROCESS FOR MANUFACTURING β-ALKOXY THIOCARBOXYLIC ACID ESTERS
Herbert Eck and Joseph Heckmaier, Burghausen, Upper Bavaria, and Helmut Prigge, Munich, Bavaria, Germany, assignors to Wacker-Chemie G.m.b.H., Munich, Bavaria, Germany, a corporation of Germany
No Drawing. Filed Mar. 22, 1968, Ser. No. 715,191
Claims priority, application Germany, Mar. 23, 1967
W 43,629
Int. Cl. C07c 153/07; C08f 45/46
U.S. Cl. 260—455                                    6 Claims

ABSTRACT OF THE DISCLOSURE

The process reacts hemithioacetals or hemithioketals in the presence of a strongly acid catalyst, at temperatures between −80° C. and +200° C., with ketenes to produce the corresponding β-alkoxythiocarboxylic acid esters.

BACKGROUND OF THE INVENTION

The reaction of ketene with acetals in the presence of strongly acid catalysts to form β-alkoxy carboxylic acid esters is known.

SUMMARY OF THE INVENTION

We have now discovered a process which permits the reaction of hemithioacetals or hemithioketals having the general formula

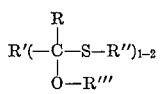

in the presence of a strongly acid catalyst, at temperatures between −80° C. and +200° C., preferably between −20° C. and +90° C., in the presence of a solvent if desired, with ketenes of the general formula

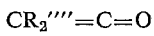

to produce the corresponding β-alkoxythiocarboxylic acid esters having the general formula

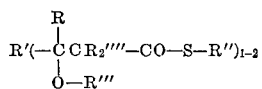

in which
R=H, alkyl
R'=H, a branched or unbranched chain, substituted or unsubstituted alkyl or aryl residue;
R''=a branched or unbranched chain, substituted or unsubstituted alkyl or aryl residue; a prerequisite for R'' being that C—SR''— bond is not too highly sterically hindered by its substituents and that the α-carbon in the R'' bonded to sulphur is substituted only by hydrogen and/or carbon;
R'''=a branched or unbranched chain, substituted or unsubstituted alkyl residue; a prerequisite for R''' being that it does not render the oxygen too strongly positive (as is the case with the phenyl residue, for example) that its substituents do not too strongly sterically hinder the C—OR'''— bond, and that the α-carbon of the R''' group bonded to oxygen is substituted only by hydrogen and/or carbon;
R''''=H, alkyl, chlorine.

DESCRIPTION OF THE PREFERRED EMBODIMENTS

Suitable hemithioacetals are, for example: 2-ethylhexanal-semithiodiethylacetal, benzaldehyde semithiodibutylacetal, propionaldehyde semithiodibenzylacetal, terephthalaldehyde di-(semithiodiethylacetal), caprylic aldehyde-semithio(γ-chloropropyl acetal), butyraldehyde-semithiodimethyl acetal, α-butylthioether-diethyl ether, α-phenylthioether-diethyl ether and (ethyl-α-benzyl ether)-thiobutyl ether.

If cyclic hemithioacetals are used, i.e., compounds where R'' and R''' are connected with one another by a branched or unbranched chain, perhaps substituted alkyl or aryl residue, e.g., 2-methyl-1,3-semithiodioxolane, 2-phenyl-1,3-semithiodioxolane, 4-methyl-1,3-semithiodioxane and 2-methyl-1,3-semithiodioxepane, the corresponding cyclic ether thiolactone is not obtained as a reaction product, but rather the polyether thioester formed from it, since the former is unstable under the conditions used and oligomerizes. The degree of polymerization in this case is 2–15. Use of linear polyhemithioacetals as starting materials yields the corresponding polyether thiocarboxylic acid ester by the analogous reaction. Suitable hemithioketals are, for example: acetone semithiodiethylketal, acetone semithiodibutylketal, propyl methyl ketone-semithiodiethylketal and ethyl methyl ketone-semithiodibenzylketal.

Suitable acid catalysts may be mineral acids such as phosphoric, hexafluorophosphoric and/or Friedel-Crafts catalysts such as boron trifluoride etherate, aluminum chloride, and zinc chloride. In catalysts such as hexafluorophosphoric acid, for example, a concentration of 0.05%, based on hemithioacetal or hemithioketal used, is sufficient. The upper limit is determined by economic considerations and is generally not more than 10%. Catalyst concentrations between 0.2% and 3% are conventionally employed.

The process may be performed continuously or batchwise, in the vapor or liquid phase.

All inert solvents such as ether, chlorinated hydrocarbons such as methylene chloride, trichlorethylene, carbon tetrachloride, chlorobenzene and dichlorobenzene, hydrocarbons such as benzene, toluene, petroleum ether and cyclohexane, β-alkoxythiocarboxylic acid esters, e.g., β-ethoxythiobutyric acid butyl ester, and also dimethylformamide, alkyl esters of acetic acid, acetic anhydride, nitrobenzene and silicon tetraalkylate, for example, are suitable for operations in solution.

The process may be performed at ordinary, super or subatmospheric pressure. Superatmospheric pressure is ordinarily employed for sluggish hemithioacetals, e.g., ethyl (α-benzyl ether)-thiobutyl ether, while subatmospheric pressure is commonly used only where preparation of the appropriate ketene requires it, e.g., α,α-dimethyl-β-(2-ethylhexyl ether)thiobutyric acid ethyl ester.

It is surprising that in the reaction process of the present invention the ketene adds to the C—SR''— bond and not to the C—OR'''—bond, which is much more reactive in these types of transformations, and, indeed, does so regardless of whether the sulphur is alkyl- or aryl-substituted. The other reaction mechanism would have to have been expected in every case, on the basis of past experience.

The products of the present invention are suitable plasticizers for polyvinyl chloride, for example, and as plant protective agents, as well as for preparation of plastics and pharmaceutically active compounds.

EXAMPLE 1

A solution of 45 g. α-butylthioether-diethyl ether, 1.5 g. boron trifluoride dietherate and 160 g. absolute ether was treated at room temperature, for 20 minutes, with 19 g. ketene. After neutralizing the boron trifluoride with sodium acetate, the reaction mixture was washed with water and purified by distillation. The yield of butyl β-ethoxythiobutyrate, B.P. 64–65° C. at 0.4 mm. Hg, was 70% of theory, based on the α-butylthioether-diethyl ether used. Structure was determined NMR-spectroscopically.

EXAMPLE 2

A solution of 50 g. 2-ethylhexanal-semithiodiethylacetal and 1 g. hexafluorophosphoric acid in 150 ml. methylene chloride was treated for 30 minutes with 20 g. ketene at 0° C. The reaction mixture was neutralized with sodium acetate and then washed with water and distilled. Yield of ethyl β-ethoxy-γ-ethylthiocaprylic acid ethyl ester was 65% of theory, based on the 2-ethylhexanal-semithiodiethylacetal used. Boiling point: 95–97° C. at 0.3 mm. Hg.

*Analysis.*—Found (percent): C, 63.39; H, 10.94; S, 12.97. Computed (percent): C, 64.12; H, 11.45; S, 12.21.

Structure was confirmed IR-spectroscopically.

EXAMPLE 3

A solution of 70 g. α-phenylthioether-diethyl ether in 150 g. ether was treated with three mol equivalents of ketene at −5–0° C., in the presence of 1 ml. hexafluorophosphoric acid. Conventional workup yields 15 g. β-ethoxythiobutyric acid phenylester, in addition to 18 g. starting material. Boiling point: 108–110° C. at 0.03 mm. Hg. Structure was determined NMR-spectroscopically.

EXAMPLE 4

15 g. ketene was fed during 60 minutes at 0° C. through a solution of 30 g. 2-methyl-1,3-semithiodioxolane and 0.5 ml. hexafluorophosphoric acid in 150 ml. methylene chloride. The reaction product was neutralized with sodium acetate, washed with water and freed of low boiling material by heating at 100° C. bath temperature and $10^{-3}$ mm. Hg. The residual oil (33 g.) had molecular weight 650. The structure

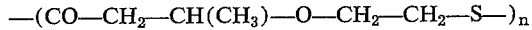

was elucidated NMR-spectroscopically

EXAMPLE 5

A solution of 30 g. 2-phenyl-1,3-semithiodioxolane in 150 ml. methylene chloride was treated in the presence of 0.5 g. hexafluorophosphoric acid with 20 g. ketene. The product was purified as in Example 4. Crude yield: 39.5 g. Yield of pure polyetherthioester: 17.6 g. The structure

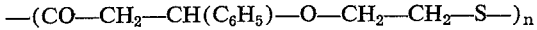

was confirmed by IR- and NMR-spectroscopy.

EXAMPLE 6

30 g. (ethyl-α-benzyl ether)-thiobutyl ether was dissolved in 350 ml. tetraethylsilane in an autoclave and treated with 1 g. hexafluorophosphoric acid. 20 g. ketene was passed into this mixture at −40° C., the autoclave closed and allowed to stand over night at 0–5° C. Workup as in Example 2. Yield of β-benzyl ether-thiobutyric acid butyl ester was 40% of theory. Boiling point: 122–125° C. at 0.004–0.005 mm. Hg. The structure was confirmed by IR-spectroscopy.

We claim:

1. Process for making β-alkoxythiocarboxylic acids of the structure

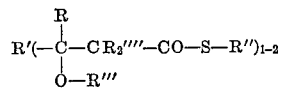

in which a member of the group consisting of hemithioacetals and hemithioketals of the formula

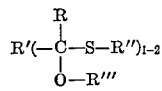

is treated in the presence of a strongly acid catalyst, at temperatures between −80 and 200° C. with a ketene having the formula

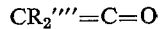

in which

R=H, alkyl

R′=H, a branched or unbranched chain alkyl or aryl residue;

R″=a branched or unbranched chain alkyl or aryl residue; a prerequisite for R″ being that C—CR″—bond is not too highly sterically hindered by its substituents and that the α-carbon in the R″ bonded to sulphur is substituted only by hydrogen and/or carbon;

R‴=a branched or unbranched chain alkyl residue; a prerequisite for R‴ being that it does not render the oxygen too strongly positive that its substituents do not too strongly sterically hinder the C—OR‴—bond, and that the α-carbon of the R‴ group bonded to oxygen is substituted only by hydrogen and/or carbon;

R″″=H, alkyl, chlorine.

2. Process according to claim 1, characterized by the fact that mineral acids are used as acid catalysts.

3. Process according to claim 1, characterized by the fact that the acid catalyst is selected from the group consisting of fluorophosphoric acids and Friedel-Crafts catalysts.

4. Process according to claim 1, characterized by the fact that catalysts are used in amounts of 0.05% to 10%.

5. Process according to claim 1, characterized by the fact that the reaction is performed in a solvent selected from the group consisting of ethers, hydrocarbons, chlorinated hydrocarbons, carboxylic acid alkyl esters, β-alkoxythiocarboxylic acid esters and tetraalkylated silicons.

6. Process for manufacturing β-alkoxy thiocarboxylic acid esters which comprises reacting a ketene with a compound of the group consisting of hemithioacetals and hemithioketals at a temperature of −80° C. to +200° C., the ketene having the formula 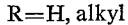, where R″″ is H, alkyl or chlorine, in the presence of an acid catalyst, and then neutralizing and distilling the reaction mixture.

References Cited

UNITED STATES PATENTS 2,436,286  2/1948  Brooks _____ 260—484

LEWIS GOTTS, Primary Examiner

D. G. RIVERS, Assistant Examiner

U.S. Cl. X.R.

47—58; 71—100; 260—30.8